United States Patent [19]

Potter et al.

[11] Patent Number: 5,826,834
[45] Date of Patent: Oct. 27, 1998

[54] SELF ADAPTIVE LIMITER FOR AUTOMATIC CONTROL OF APPROACH AND LANDING

[75] Inventors: William F. Potter; Byron F. Birkedahl, both of Glendale, Ariz.

[73] Assignee: Honeywell Inc., Minneapolis, Minn.

[21] Appl. No.: 325,836

[22] Filed: Oct. 19, 1994

[51] Int. Cl.$^6$ ............................................. G05D 1/06
[52] U.S. Cl. ......................... 244/195; 244/181; 244/185; 244/186; 244/195
[58] Field of Search .................... 244/195, 76 R, 244/181, 183, 184, 185, 186, 194; 364/433, 434; 318/584, 585, 586

[56] References Cited

U.S. PATENT DOCUMENTS

| | | | |
|---|---|---|---|
| 3,519,806 | 7/1970 | Lami et al. | 244/183 |
| 3,698,669 | 10/1972 | Miller | 244/186 |
| 3,887,148 | 6/1975 | Devlin | 244/186 |
| 3,930,610 | 1/1976 | Hache | 244/181 |
| 4,043,526 | 8/1977 | Donley et al. | 244/195 |
| 4,236,685 | 12/1980 | Kissel | 244/195 |
| 4,485,446 | 11/1984 | Sassi . | |
| 4,609,987 | 9/1986 | Greene | 244/195 |
| 4,714,929 | 12/1987 | Davidson . | |
| 4,947,165 | 8/1990 | Zweifel | 244/181 |
| 5,224,664 | 7/1993 | Adams, Sr. et al. | 244/194 |
| 5,361,065 | 11/1994 | Johnson et al. | 244/181 |
| 5,377,937 | 1/1995 | LaMay et al. . | |

FOREIGN PATENT DOCUMENTS

| | | |
|---|---|---|
| 0078688 | 5/1983 | European Pat. Off. . |
| 0084447 | 7/1983 | European Pat. Off. . |
| 0109315 | 5/1984 | European Pat. Off. . |
| 0253614 | 7/1987 | European Pat. Off. . |
| 0530924 | 3/1993 | European Pat. Off. . |
| 2240957 | 8/1991 | United Kingdom ............. G05D 1/06 |

*Primary Examiner*—Andres Kashnikow
*Assistant Examiner*—Trin Dinh
*Attorney, Agent, or Firm*—Brian C. Downs; Ronald E. Champion

[57] ABSTRACT

A self adaptive limiter for use in aircraft control systems during approach and landing is disclosed. Estimated flight path angle is continuously computed during the glidepath tracking phase until a predetermined lock altitude above ground when a nominal flight path angle is latched. Nominal vertical speed is continuously computed below the lock altitude as a function of the latched nominal flight path angle and ground speed of the aircraft. A vertical speed limit function is generated as a function of the nominal vertical speed and radio altitude. During approach and landing a pitch limit is computed from the vertical speed limit, vertical speed, ground speed, and pitch. When a pitch command to the autopilot exceeds the pitch limit(i.e. commands excessive pitch down attitude), it is limited to the pitch limit thus preventing the aircraft from descending below a safe altitude. The invention is self-adaptive since the pitch limit varies in response to changes in the ground speed of the aircraft, wind, and ILS beam angles.

21 Claims, 7 Drawing Sheets

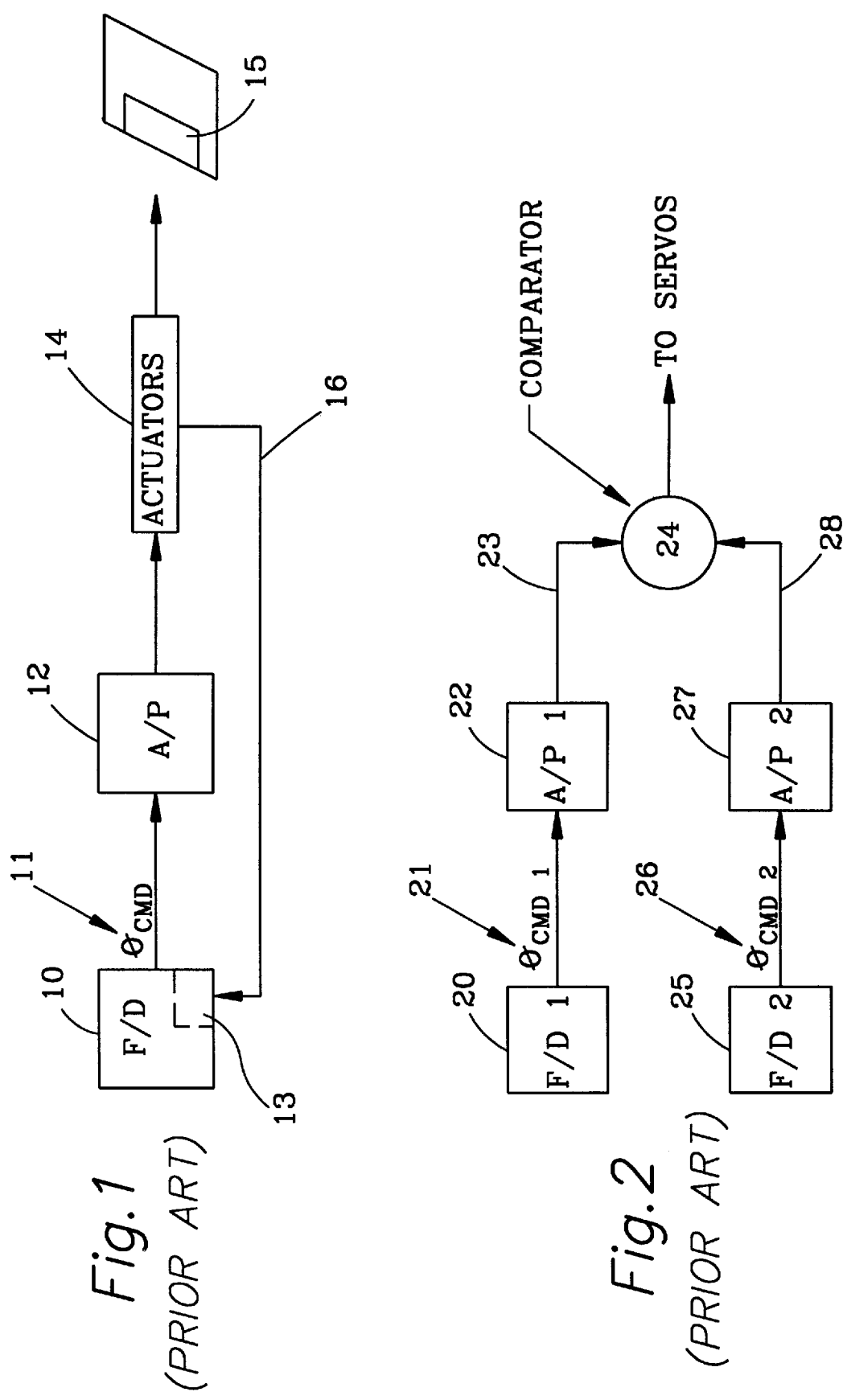

SELF ADAPTIVE LIMITER FOR AUTOMATIC CONTROL OF APPROACH AND LANDING

BACKGROUND OF THE INVENTION

The present invention relates generally to flight control systems for aircraft and more specifically to fail passive flight control systems for approach and landing.

Flight control systems control an aircraft's flight profile including takeoff, climb, cruise, descent, approach, and landing. Flight control systems often comprise several different components which influence the control of an aircraft. A basic flight control system includes an autopilot and a flight director. More sophisticated systems include flight management systems, performance management systems, wind shear detection systems, and the like.

The flight director generates pitch and roll commands which are communicated to the autopilot. The autopilot implements control laws pertaining to the pitch, roll, and yaw of the aircraft and directly controls actuators which in turn move the control surfaces of the aircraft.

A problem with flight control systems is that a failure can lead to catastrophic results. This problem is particularly acute during approach and landing where the aircraft is in close proximity to the ground giving a pilot little time to react to a flight system failure.

Two categories of failures are "hardover" failures and "slowover" failures. Hardover failures are failures in the hardware or software of a flight control system that command abrupt full scale movement of an aircraft control surface. Slowover failures, on the other hand, are failures in the hardware or software of the flight control system which cause a slow or gradual deviation from the desired flight command.

In the past prevention and detection of hardover failures received most attention since it was presumed that hardover failures were the most common type of failure and were considered to be the most dangerous. Hardover failures are dangerous, however, because of their abrupt nature, pilots generally know immediately when a failure has occurred and are able to take corrective action. Recently, slowover failures have received increased attention. Slowover failures are especially dangerous because their gradual deviation is not readily noticed. Consequently, a slowover failure may not be noticed by the pilot until it is too late to prevent a catastrophe.

One approach to detection and prevention of failures is illustrated in FIG. 1 where flight director 10 communicates a pitch command 11 to autopilot 12 which controls the aircraft servos or actuators 14 which in turn control the aircraft flight surfaces 15. In some prior art systems, autopilot fault detection 13 is provided in the flight director 10. In these systems, autopilot fault detection 13 compares feedback 16 from actuators 14 to desired flight director commands 11 thus verifying proper operation of autopilot 12. This type of fault detection and similar systems only detect failures in the autopilot 12 and do not detect failures in the flight director 10. Slowover failures can result from this failure to detect flight director failures.

Another approach used in the prior art are multi-channel flight control systems as illustrated in FIG. 2. Multi-channel flight control systems use multiple flight control channels each of which communicate commands to a comparator which detects differences between the channels. In a multi-channel system a first flight director 20 computes a first pitch command 21 to a first autopilot 22 which in turn transmits a first servo command 23 to comparator 24. A second flight director 25 communicates a second pitch command 26 to a second autopilot 27 which in turn communicates a second servo command 28 to comparator 24. If comparator 24 detects a significant difference between the commands the comparator attempts to determine which signal or command is correct and disregards the erroneous signal. However, if both channels are identical, a generic failure can occur in both channels simultaneously resulting in both commands being erroneous.

To prevent generic failures, multi-channel multi-version flight control systems are predominantly used. These systems use multiple dissimilar channels which differ in hardware design, software design, or both hardware and software design from the other channels. This design eliminates the possibility of generic failures in the hardware or the software.

Multi-channel multi-version flight control systems are reliable, however, they are expensive. Multiple versions of software must be developed, multiple versions of hardware must be developed, and both systems must produce nearly identical commands at nearly the same time (known as cross equalization) for the comparator to operate correctly.

Even in sophisticated, multi-channel multi-version flight control systems there may be problems if the ILS glide slope signal is lost or fails during the approach phase of flight. If the ILS signal is erroneous the aircraft may follow the signal and descend below a safe altitude.

FIG. 3 illustrates the affect of a slowover failure during approach. On approach aircraft 30 follows the ILS approach flight path 31 to runway 32. Aircraft 30 must remain at a safe altitude above the terrain 33. A slowover failure of the pitch or vertical speed of the aircraft can cause aircraft 30 to gradually descend below a safe altitude on approach as illustrated by alternate flight paths 34A, 34B, 34C, and 34D.

The operational safety of flight control systems would be greatly enhanced by the ability to detect slowover failures especially during approach and landing of an aircraft. Current single channel flight control systems do not adequately address the problem of slowover failures. Similarly, multi-channel and multi-version flight control systems would be enhanced if each channel of the multi-channel system was able to detect slowover failures.

All flight control systems, whether single channel or multi-channel, would benefit from a system which provides protection against an erroneous ILS glideslope signal during approach and landing.

Clearly there exists a need for a system and method which detects slowover failures during approach and landing, does not require multiple channels, and provides protection against failure of ILS glideslope signals.

SUMMARY OF THE INVENTION

The invention creates a self-adaptive limiter for use in aircraft control systems during approach and landing.

In the preferred embodiment the limiter limits the pitch command communicated from a flight director to an autopilot during approach and landing. The limiter computes a pitch limit value in a unique way which is simple, automatically adapts to changes in the ground speed of the aircraft, wind, and ILS beam angles; and is easily adapted to other aircraft.

To compute the pitch limit the limiter first computes an estimated flight path angle as a function of the vertical speed and ground speed of the aircraft. An average (or nominal) flight path angle is continuously computed from the estimated flight path angle during glideslope tracking phase of the approach until, at a predetermined lock altitude above ground, the nominal flight path angle is latched and remains constant for the remainder of the approach and landing.

Below the lock altitude a nominal vertical speed is continually computed as a function of the latched nominal flight path angle and ground speed. From nominal vertical speed and radio altitude a vertical speed limit is also continuously computed. The vertical speed limit is computed to ensure that if the aircraft does not exceed the vertical speed limit then it will not descend below the certification terrain clearance requirements. The vertical speed limit is converted into a corresponding pitch limit value allowing easy comparison and limiting of pitch commands communicated to the autopilot.

When a pitch command exceeds the pitch limit(i.e. commands excessive pitch down attitude) it is limited to the pitch limit value thus preventing the aircraft from pitching down excessively and descending below the certification terrain clearance requirements.

The limiter is self-adaptive since the pitch limit computed by the limiter adapts to changes in the ground speed of the aircraft, winds, and ILS beam angles.

FIG. 4 illustrates the affect of the invention during a slowover failure.

Aircraft 30 normally follows ILS glideslope 31 to a safe landing on runway 32. When a slowover failure causes aircraft 30 to deviate from the glideslope 31, as illustrated by alternate flight paths 40A, 40B, and 40C, the limiter limits the pitch commands so that aircraft 30 does not descend below a safe altitude thus preventing catastrophic results.

An object of the invention is to prevent unreasonable flight director commanded maneuvers on approach and landing at low altitude.

Another object of the invention is to provide fail-passive operation during approach and landing at low altitude.

A feature of the invention is the self-adaptive algorithm used to compute the pitch limit.

An advantage of the invention is dissimilar architecture between the flight director and the limiter thus preventing generic failures.

Another advantage is the simple design which is easily implemented and requires minimal execution time.

Yet another advantage is that no cross-channel equalization is required.

Yet another advantage is the protection provided against ILS glideslope signal failures.

In summary, the invention increases the safety of flight control systems by detecting and correcting slowover failures during approach and landing. The invention is simple to implement, can be implemented in almost any flight control system, is easily ported to different aircraft, and also provides protection against ILS glideslope system failures.

The significant features of the invention are illustrated in the figures and described more fully below.

BRIEF DESCRIPTION OF THE DRAWINGS

FIG. 1 is a block diagram of a single channel flight control system.

FIG. 2 shows a multi-channel flight control system.

DESCRIPTION OF THE INVENTION

Figure 3:
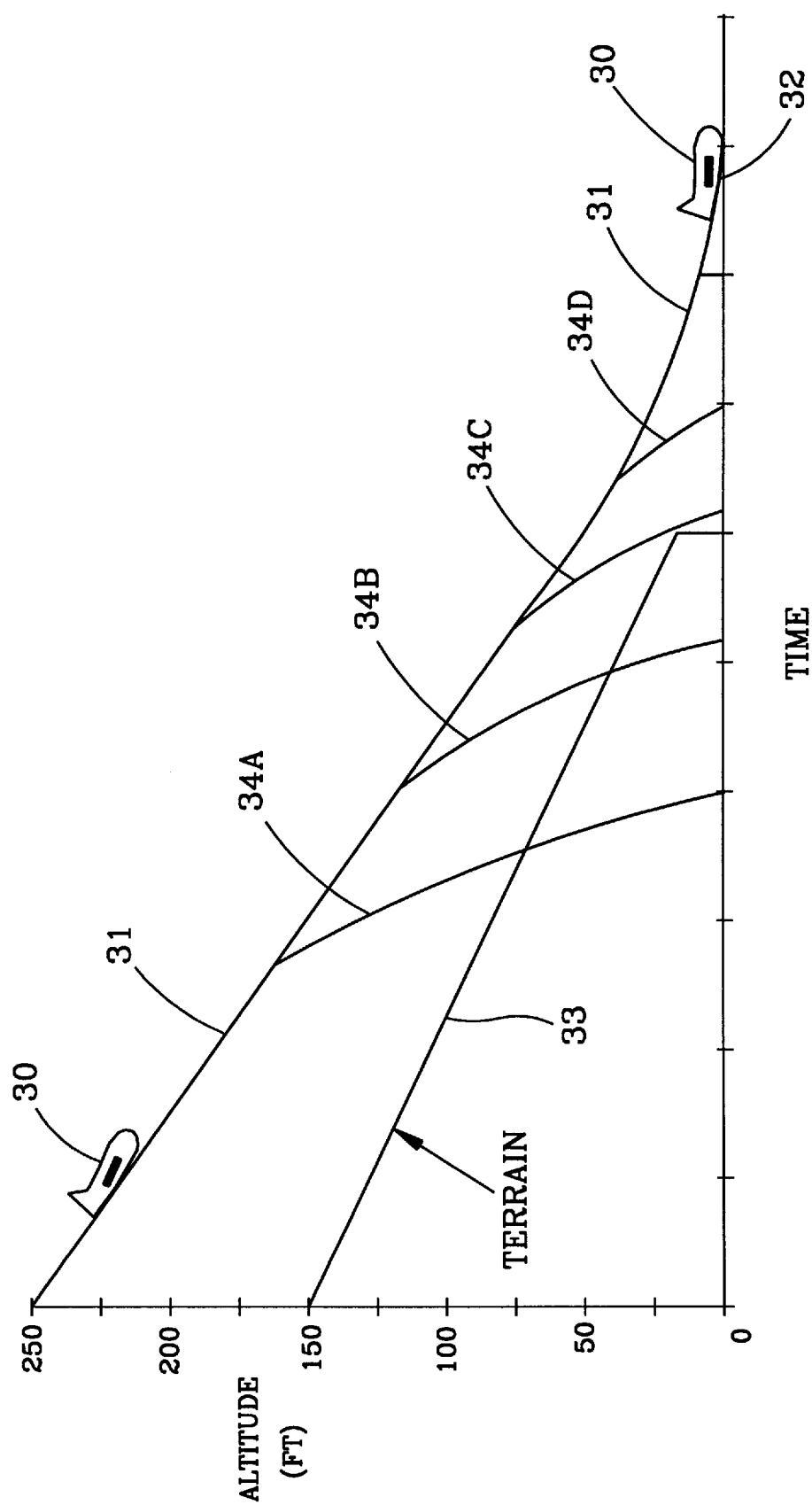
FIG. 3 illustrates the affect of a slowover failure on the flight path of an aircraft on approach.
Figure 4:
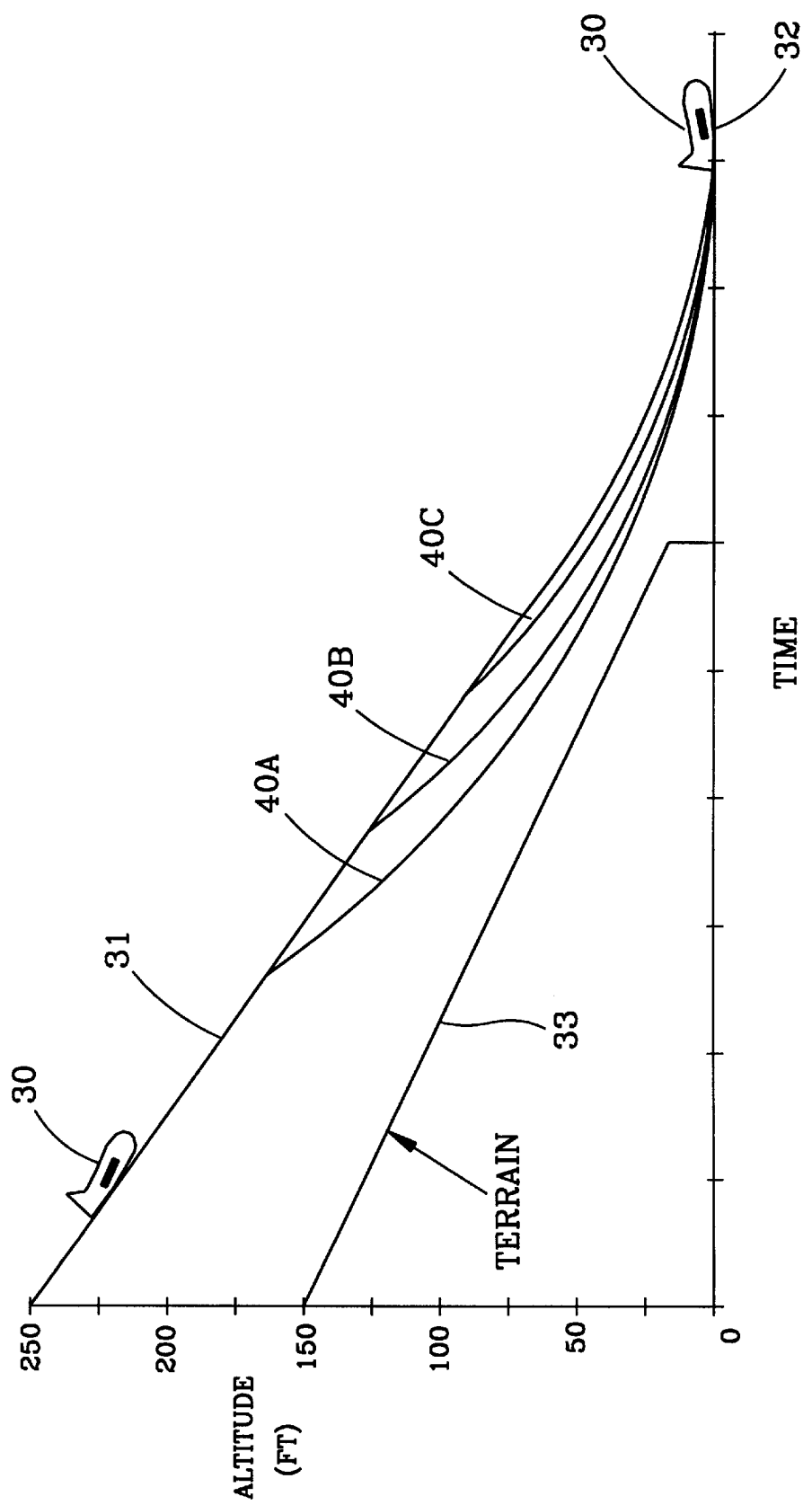
FIG. 4 illustrates the affect of the invention on the flight path during a slowover failure on approach.
Figure 5:
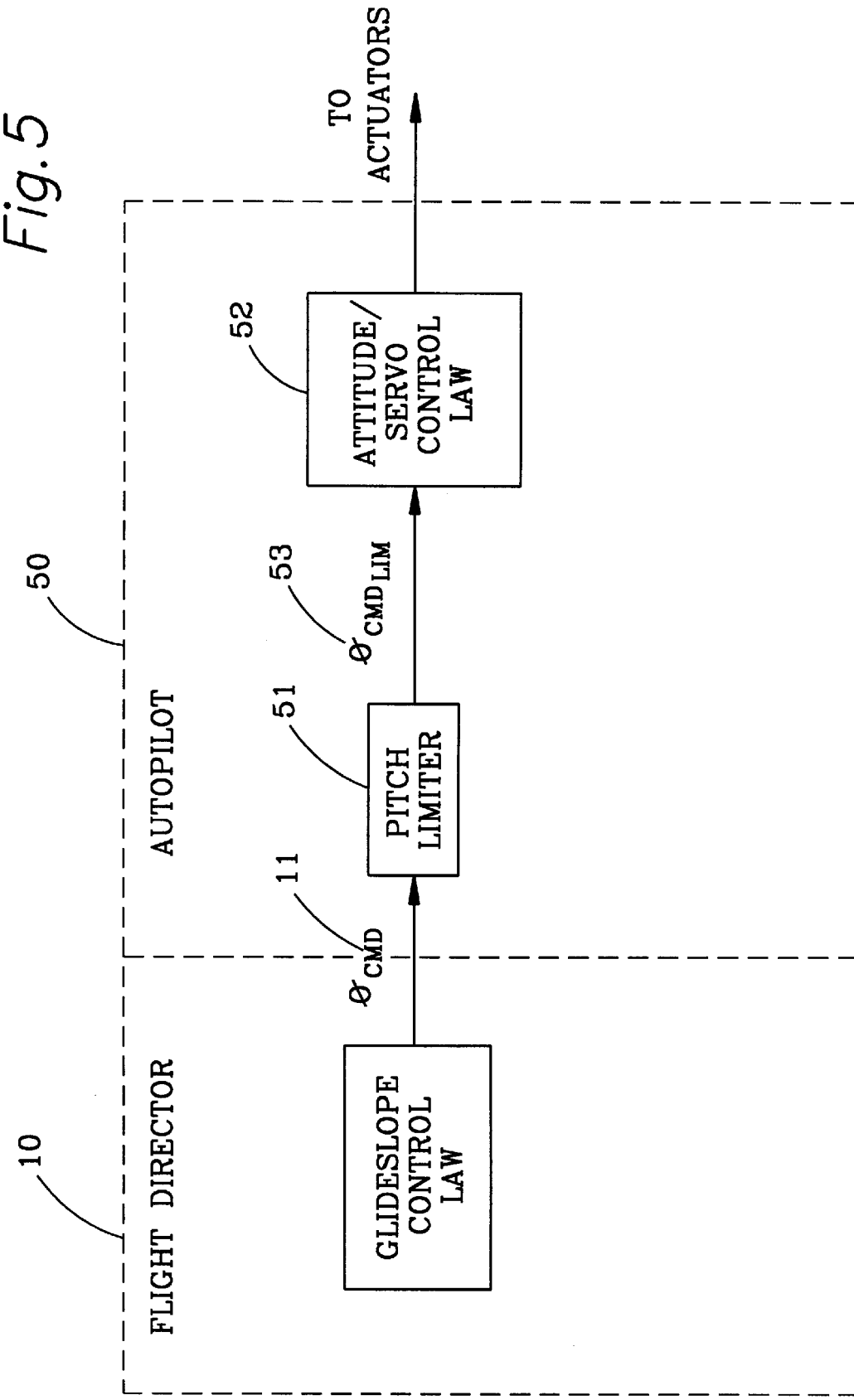
FIG. 5 illustrates the invention embodied as a single channel flight control system.

FIG. 5 illustrates the preferred embodiment of the invention as a pitch limiter in a single channel flight control system.

Flight director 10 generates a pitch command 11 which is communicated to autopilot 50. Pitch limiter 51 is preferably part of autopilot 50. Pitch command 11 is processed by pitch limiter 51 before it is processed by the control law portion 52 of autopilot 50. The invention's simple design allows it to be easily incorporated into autopilot 50.

Typically flight director 10 and autopilot 50 are separate boxes which communicate via cable, wires, buses, or the like. However, in some systems the flight director and the autopilot may be incorporated into a single box and may even share hardware resources such as memory and processors.

The preferred embodiment has separate processors and memory for the flight director and the autopilot. The limiter is incorporated into the front end of the autopilot such that pitch commands to the autopilot are checked, and limited if necessary, prior to processing by the remainder of the autopilot. This embodiment provides safety related advantages since the limiter algorithm is dissimilar from the flight director algorithms and is implemented on separate hardware thus reducing the risk of generic failures.

During approach pitch limiter 51 is activated to check pitch commands 11 communicated to autopilot 50 to verify that pitch commands 11 will not cause the aircraft to descend below a safe altitude.

Pitch limiter 51 communicates the limited pitch command 53 to the control law portion 52 of autopilot 50 which transmits commands to the appropriate aircraft actuators which move the control surfaces thus implementing the pitch command.

Those of ordinary skill in the art recognize the invention can be implemented in several alternate embodiments including, but not limited to, placing the pitch limiter in the flight director 10 or in a separate box. If the limiter is part of the flight director, however, it does not have the advantage of dissimilar hardware platforms between the pitch limiter 51 and flight director 10 and is therefore more susceptible to generic failures.

Figure 6:
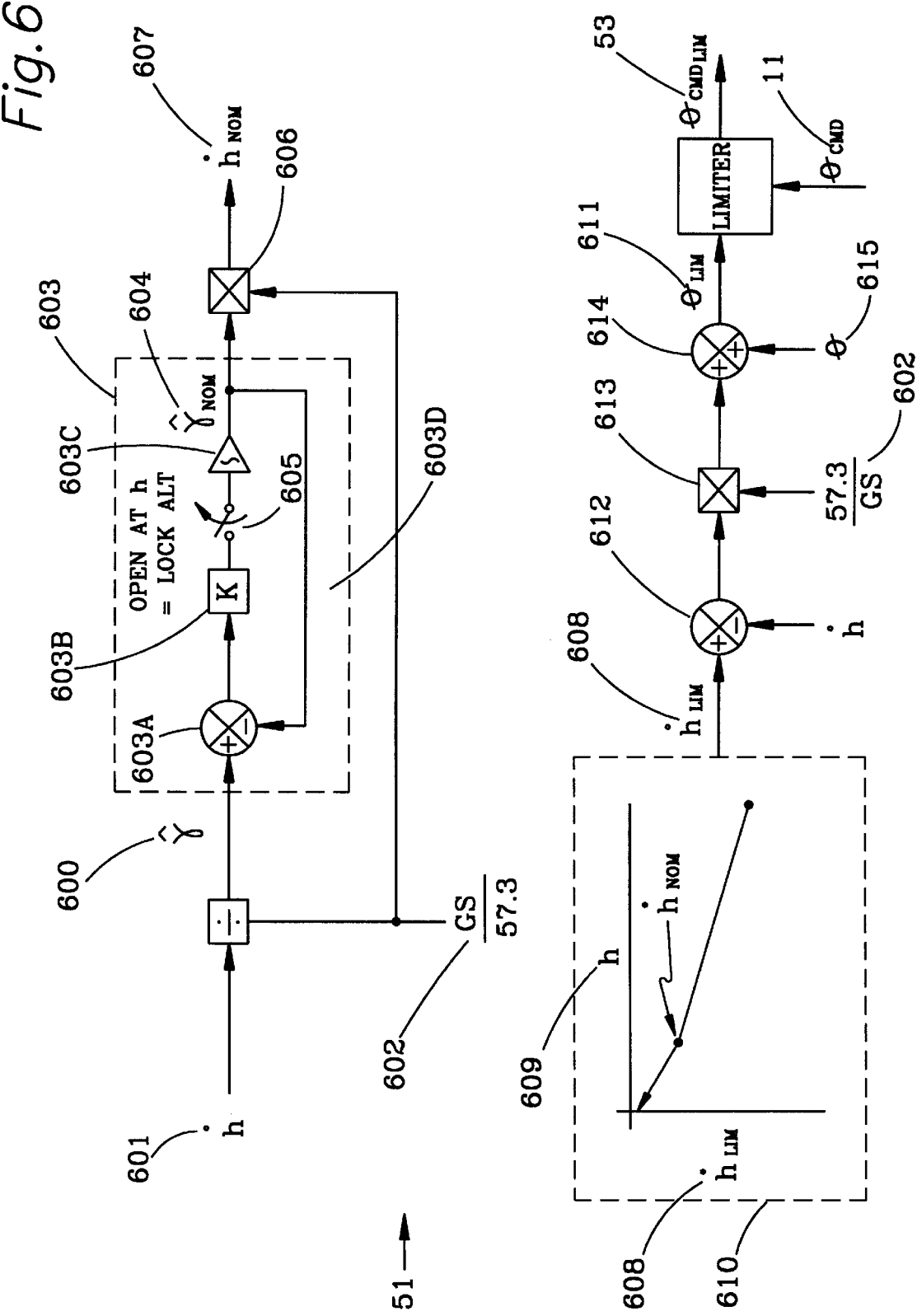
FIG. 6 is a block diagram of the invention.

FIG. 6 is a block diagram of the preferred embodiment of the invention.

Pitch limiter 51 computes estimated flight path angle 600 from the vertical speed 601 and ground speed 602 of the aircraft. Vertical speed 601 of the aircraft is divided by ground speed 602 of the aircraft over 57.3 which is a conversion factor representing the number of degrees per radian. Vertical speed 601 is obtained from other aircraft systems such as the air data computer system, the inertial reference system, the attitude heading reference system, or the like. Similarly, ground speed 602 is obtained from other systems in the aircraft. Although the preferred embodiment uses ground speed, it is understood that true air speed or other value representative of the horizontal speed of the aircraft may also be used. In the remainder of this specification the term "horizontal speed" is used to represent either ground speed, true air speed, or similar velocity measurement.

Those of ordinary skill in the art also understand that the various inputs(vertical speed, ground speed, etc.) are converted to common units prior to being combined.

The term "57.3" is used to compute a small angle approximation for the tangent and arc tangent trigonometric functions and is used to reduce execution time.

Estimated flight path angle 600 is input to averaging filter 603. Averaging filter 603 averages estimated flight path angle 600 over time to produce a nominal flight path angle 604 which is representative of the actual flight path angle of the aircraft.

The preferred embodiment uses an averaging filter comprising a difference device 603A, a time constant 603B, an integrator 603C, and a feedback loop 603D. Feedback loop 603D communicates nominal flight path angle 604 to difference device 603A which calculates the difference between the nominal flight path angle 604 and the estimated flight path angle 600 producing a difference flight path angle which is input to time constant 603B which limits the amount of change per unit time. The output of time constant 603B is communicated to the input of integrator 603C through switch 605.

Switch 605 represents the latching of the nominal flight path angle 604 when the aircraft descends below the lock altitude which is 225 feet above ground level in the preferred embodiment. Those skilled in the art recognize that the lock altitude may be changed as desired for an alternate embodiment.

Integrator 603C sums the values communicated to its inputs and generates nominal flight path angle 604. When the aircraft descends through the lock altitude, averaging filter 603 is disabled by switch 605 and nominal flight path angle 604 is latched and remains constant for the remainder of the approach and landing.

Those of ordinary skill in the art readily recognize many alternate embodiments of averaging filter 603 which are known in the art and will accomplish substantially the same result. Likewise, those skilled in the art recognize that switch 605, which latches the nominal flight path angle value, may be implemented in many equivalent ways, particularly if the invention is implemented in software.

Nominal flight path angle 604 is next communicated to multiplier 606. Multiplier 606 multiplies nominal flight path angle 604 times horizontal speed 602 over 57.3 degrees per radian thus producing nominal vertical speed 607. As discussed above, 57.3 is the small angle approximation for the tangent and arc tangent functions.

Nominal vertical speed 607 is self-adaptive since it varies according to changes in horizontal speed 602. If the horizontal speed changes during approach and landing, nominal vertical speed 607 is automatically changed to adapt to the change.

Vertical speed limit 608 is calculated as a function of nominal vertical speed 607 and altitude 609 of the aircraft above the ground. The vertical speed limit function is illustrated by the function displayed inside of box 610. Calculation of vertical speed limit 608 is described in detail below.

Radio altitude is the preferred measurement for altitude 609, however, those skilled in the art understand that other altitude measurements may be used.

Vertical speed limit 608 represents the maximum safe descent rate for the aircraft on approach and landing. The vertical speed limit function is self-adaptive since it is dependent on nominal vertical speed 607 which is also self-adaptive. Accordingly, as the aircraft horizontal speed changes during approach and landing so does vertical speed limit 608.

Those of ordinary skill in the art see that vertical speed limit 608 can readily be adapted for use in many flight control systems to limit the vertical speed of an aircraft on approach and landing. In the preferred embodiment, however, vertical speed limit 608 is converted to an equivalent pitch limit which allows easy comparison and limiting of pitch commands between a flight director and an autopilot.

Pitch limit 611 is computed from vertical speed limit 608 as follows. First, the difference between vertical speed limit 608 and actual vertical speed 601 of the aircraft is computed by second difference device 612. The output of second difference device 612 is input into second multiplier device 613 which produces a difference flight path angle by multiplying the output of difference device 612 by 57.3 degrees per radian over horizontal speed 602. As discussed above, 57.3 is used to compute the small angle approximation for the tangent and arc tangent functions.

The output of second multiplier 613 is input to summing device 614 which adds actual pitch attitude 615 of the aircraft thus producing pitch limit 611. Pitch limit 611 is easily compared to pitch commands 11 received by an autopilot 50. It should be noted that pitch limit 611 is self-adaptive and changes during approach and landing as the wind and horizontal speed 602 of the aircraft changes.

Figure 7:
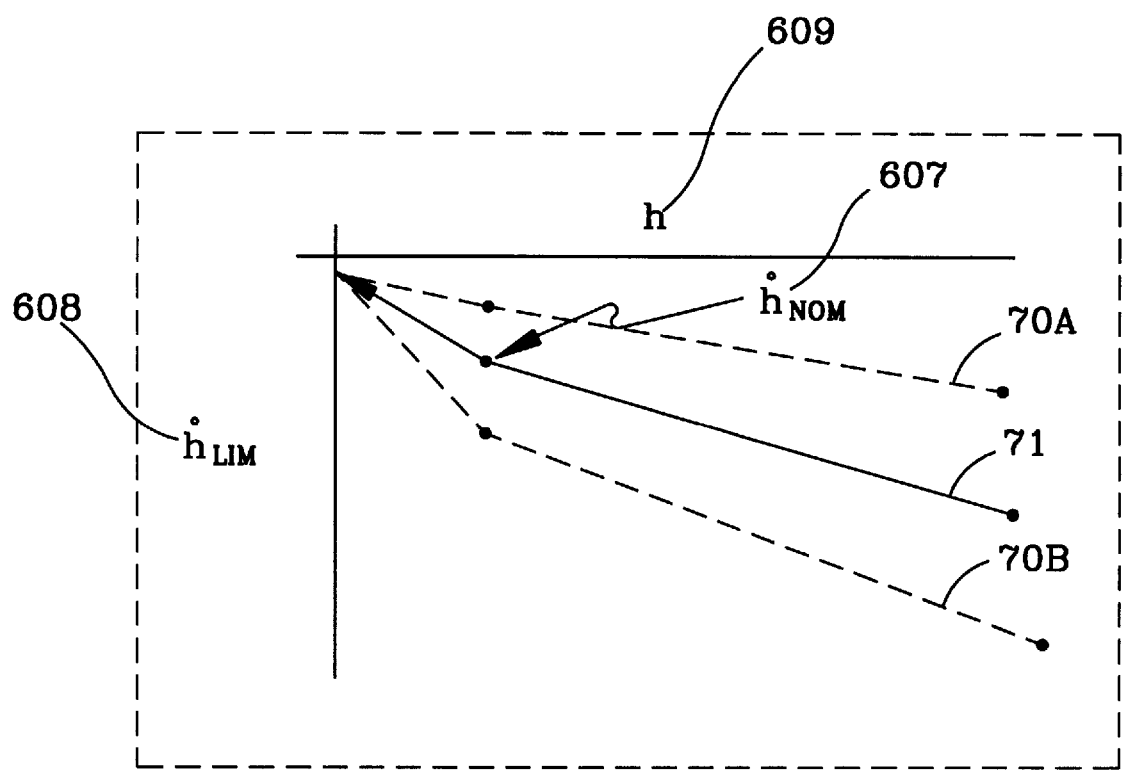
FIG. 7 illustrates the vertical speed limit function in detail.

FIG. 7 illustrates the vertical speed limit function.

Vertical speed limit 608 is a function of altitude 609, nominal vertical speed 607, and a predetermined safety margin. Between 225 feet above ground level and 50 feet above ground level, vertical speed limit 608 is computed as:

$$vertical\ speed\ limit = \dot{h}_{nom} + safety\ margin$$

Where $\dot{h}_{nom}$ is nominal vertical speed and safety margin is a linear function which is 0.75 times nominal vertical speed at 200 feet above ground level, 0.25 times nominal vertical speed at 100 feet above ground level and 0 at 50 feet above ground level. Preliminary research indicates that this linear safety margin function is adequate to prevent an aircraft from exceeding(i.e. descending below) the certification terrain clearance requirements.

Below 50 feet(flair altitude) the vertical speed limit function 71 approaches zero as altitude 609 goes to zero according to a predetermined flare function thus causing the aircraft to flare as it approaches the ground. In the preferred embodiment this is done with a linear function. However, it is envisioned that future embodiments will utilize a curved function which more closely approximates the flare maneuver of an aircraft.

It is envisioned that future embodiments of the vertical speed limit function may utilize curved safety margin functions which may extend below 50 feet.

Again, it should be noted that the vertical speed limit function 71 changes dynamically with changes in the aircraft's horizontal speed and wind. For example, as the horizontal speed of the aircraft decreases nominal vertical speed 607 also decreases causing the vertical speed limit function 71 to move toward dashed line 70A. Conversely, as the horizontal speed of the aircraft increases nominal vertical speed 607 increases causing the vertical speed limit function 71 to move toward dashed line 70B.

Figure 8:
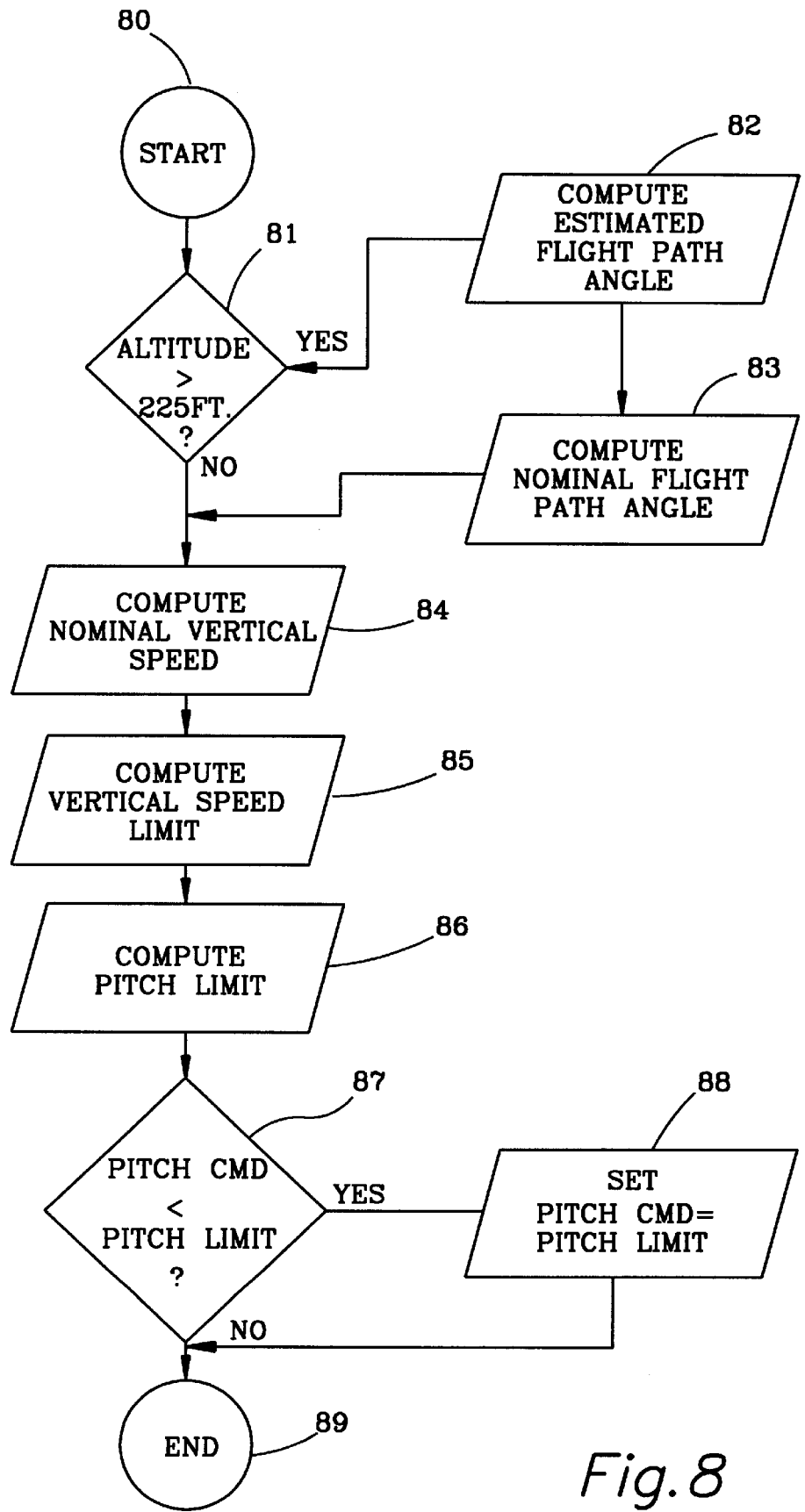
FIG. 8 is a flowchart of the invention.

FIG. 8 is a flowchart of a possible embodiment of the invention. The flowchart illustrates the major steps during one iteration. In most embodiments, these steps are executed multiple times a second during approach and landing. Those skilled in the art understand that many alternate, yet equivalent, embodiments of this flowchart are possible.

The flowchart begins at start 80 and proceeds to decision box 81 where altitude is compared to 225 feet (lock altitude). If altitude is above 225 feet then the process proceeds to compute estimated flight path angle 82 and compute nominal flight path angle 83. The process then continues to compute nominal vertical speed 84.

If altitude is less than 225 the process proceeds directly to compute the nominal vertical speed 84 and skips computation of estimated flight path angle 82 and nominal flight path angle 83 since these values are latched below 225 feet. The process continues on to compute the vertical speed limit 85 and compute the pitch limit 86. The process then proceeds to the second decision box 87 where the pitch command from the flight director is compared to the pitch limit computed in step 86 above. If the pitch command is less than the pitch limit (i.e. an excessive pitch down attitude is commanded) then the process proceeds to set the pitch command equal to the pitch limit, step 88, and then proceeds to end 89. If the pitch command is not less than the pitch limit the pitch command is not altered and the process proceeds to end 89.

Those of ordinary skill in the art recognize that many of the functions of the invention can be implemented in either hardware or software, however, the preferred embodiment is implemented in software running on a digital microprocessor.

This description of the invention has been for descriptive purposes only and is not intended to limit the scope of the invention. Those skilled in the art understand there are numerous alternate embodiments of the invention which perform substantially the same function in substantially the same way to achieve substantially the same result and are therefore equivalent to the invention.

Alternate embodiments of the invention envisioned include, but are not limited to, incorporation of the invention into multi-channel multi-version flight control systems, flight directors, flight management systems, electronic flight instrument systems(EFIS), and the like.

It is clear from the foregoing that the present invention represents a new and useful device for detection and correction of slowover failures during approach and landing. The invention is simple, reliable, eliminates the need for cross channel equalization between multiple channels, and provides protection against ILS glideslope signal failures.

The embodiments of an invention in which an exclusive property or right is claimed are defined as follows:

1. A fail operational flight control system for controlling the flight path of an aircraft within 18 miles of a destination runway, said control system in communication with aircraft systems providing vertical speed data, horizontal speed data, altitude data, and pitch data representative of said aircraft, said control system comprising:
   a) a self adaptive pitch-limit computation apparatus, said pitch-limit computation apparatus having,
      1) angle computing means for computing an estimated flight path angle,
      2) averaging means for computing a nominal flight path angle from said estimated flight path angle,
      3) vertical speed means for computing nominal vertical speed from said nominal flight path angle and said horizontal speed data, and,
      4) vertical speed limit means for computing a vertical speed limit from said nominal vertical speed.

2. The flight control system according to claim 1 wherein said pitch limit computation apparatus further comprises pitch limit means for computing a pitch limit from said vertical speed limit.

3. The flight control system according to claim 2 further comprising limiter means for limiting pitch commands in said control system such that said pitch commands do not exceed said pitch limit.

4. The flight control system according to claim 3 further comprising latch means for latching said nominal flight path angle at a predetermined altitude such that said nominal flight path angle remains constant for the remainder of the flight.

5. The flight control system according to claim 4 wherein said averaging means is an averaging filter.

6. The flight control system according to claim 5 wherein said averaging filter includes:
   a) a difference device receiving said estimated flight path angle and said nominal flight path angle and generating an output representative of the difference between said estimated flight path angle and said nominal flight path angle;
   b) a time constant having an input and an output, said input in communication with said output of said difference device; and,
   c) an integrator having an input and an output, said input in communication with said output of said time constant, said output communicating said nominal flight path angle with said vertical speed means.

7. A self adaptive pitch limit apparatus for use within 18 miles of a destination runway for limiting pitch commands communicated to an autopilot system thereby creating a fail operational flight control system, said autopilot system controlling the flight path of an aircraft responsive to said pitch commands, said limit apparatus in communication with aircraft systems supplying vertical speed data, horizontal speed data, pitch data, and altitude data, said limit apparatus comprising:
   a) flight path angle computing means for computing an estimated flight path angle from vertical speed data and horizontal speed data;
   b) averaging means, in communication with said angle computing means, for computing a nominal flight path angle from said estimated flight path angle; and,
   c) vertical speed means, in communication with said averaging means, for computing a nominal vertical speed from said nominal flight path angle and said horizontal speed.

8. The pitch limit apparatus according to claim 7 further comprising vertical speed limit means for computing a vertical speed limit from said nominal vertical speed and said altitude data.

9. The pitch limit apparatus according to claim 8 further comprising pitch limit means for computing a pitch limit from said vertical speed limit, said vertical speed data, said horizontal speed data, and said pitch data.

10. The pitch limit apparatus according to claim 9 further comprising means for limiting said pitch commands communicated to said autopilot system such that said autopilot system does not cause said aircraft to exceed said pitch limit.

11. The pitch limit apparatus according to claim 10 wherein said averaging means is an averaging filter.

12. The pitch limit apparatus according to claim 11 wherein said vertical speed limit means computes said vertical speed limit as follows:

below flare altitude:

$\dot{h}_{lim}$ approaches zero as said altitude data approaches zero per a predetermined flaring function;

above flare altitude:

$\dot{h}_{lim} = \dot{h}_{nom} +$ safety margin.

13. The pitch limit apparatus according to claim 12 wherein said averaging filter includes a time constant having:
 1) an input in communication with said means for computing an estimated flight path angle, and,
 2) an output.

14. The pitch limit apparatus according to claim 13 wherein said averaging filter includes an integrator having:
 1) an input in communication with said output of said time constant, and,
 2) an output in communication with said means for computing said nominal vertical speed.

15. A fail operational flight control system for an aircraft within 18 miles comprising:
 a) a navigation system providing vertical speed data representative of the vertical speed of said aircraft, horizontal speed data representative of the horizontal speed of said aircraft, altitude data representative of the altitude of said aircraft, and pitch data representative of the pitch of said aircraft;
 b) an autopilot controlling the pitch attitude of said aircraft; and,
 c) a self adaptive pitch limiter in communication with said autopilot such that pitch commands are processed by said pitch limiter prior to being processed by said autopilot, said pitch limiter having,
  1. means for computing an estimated flight path angle based on said vertical speed data and said horizontal speed data;
  2. means for computing a nominal flight path angle from said estimated flight path angle;
  3. means for computing a nominal vertical speed from said nominal flight path angle and said horizontal speed data;
  4. means for computing a vertical speed limit from said nominal vertical speed and said altitude data;
  5. means for computing a pitch limit from said vertical speed limit, said vertical speed data, and said pitch data; and,
  6. means for limiting said pitch commands to said autopilot such that said autopilot system does not control said aircraft to a pitch attitude below said pitch limit.

16. The aircraft according to claim 15 wherein said nominal flight path angle is latched at a predetermined altitude.

17. The aircraft according to claim 16 wherein said means for computing a nominal flight path angle is an averaging filter.

18. The aircraft according to claim 17 wherein said averaging filter includes:
 a) a time constant device having,
  1) an input in communication with said means for computing an estimated flight path angle, and,
  2) an output; and,
 b) an integrator having,
  1) an input in communication with said output of said time constant device, and,
  2) an output in communication with said means for computing a nominal vertical speed.

19. A method of computing self-adaptive vertical flight path limits for use in fail operational flight control system controlling an aircraft during approach and landing comprising the steps of:
 a) providing vertical speed data, horizontal speed data, and altitude data representative of said aircraft;
 b) computing an estimated flight path angle from said vertical speed data and said horizontal speed data;
 c) computing a nominal flight path angle from said estimated flight path angle and latching said nominal flight path angle at a predetermined altitude;
 d) computing a nominal vertical speed from said nominal flight path angle; and,
 e) computing a vertical speed limit from said nominal vertical speed.

20. The method of computing self-adaptive vertical flight path limits according to claim 19 comprising the additional steps of:
 a) providing pitch data representative of the pitch of said aircraft; and,
 b) computing a pitch limit from said vertical speed limit, said vertical speed data, said horizontal speed data, and said pitch data.

21. The method of computing a self-adaptive speed limit according to claim 20 wherein said vertical speed limit is computed as follows:

below flare altitude:

$\dot{h}_{lim}$ computed according to a predetermined flare function, above flare altitude:

$\dot{h}_{lim} = \dot{h}_{nom} +$ safety margin.

* * * * *